(12) United States Patent
Warkentin et al.

(10) Patent No.: US 12,248,799 B2
(45) Date of Patent: Mar. 11, 2025

(54) GUEST TIME SCALING FOR A VIRTUAL MACHINE IN A VIRTUALIZED COMPUTER SYSTEM

(71) Applicant: VMware, Inc., Palo Alto, CA (US)

(72) Inventors: Andrei Warkentin, South Elgin, IL (US); Ye Li, Cambridge, MA (US); Alexander Fainkichen, Southborough, MA (US); Regis Duchesne, Monts-de-Corsier (CH); Cyprien Laplace, Boston, MA (US); Shruthi Muralidhara Hiriyuru, Medford, MA (US); Sunil Kumar Kotian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 657 days.

(21) Appl. No.: 17/553,607

(22) Filed: Dec. 16, 2021

(65) Prior Publication Data

US 2023/0195484 A1 Jun. 22, 2023

(51) Int. Cl.
*G06F 9/455* (2018.01)
(52) U.S. Cl.
CPC ........... *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,327,357 B2* | 12/2012 | Amsden | G06F 9/45533 718/1 |
| 8,490,089 B2* | 7/2013 | Friebel | G06F 9/45541 713/400 |
| 2005/0081199 A1* | 4/2005 | Traut | G06F 9/45554 718/1 |

* cited by examiner

*Primary Examiner* — Eric C Wai
(74) *Attorney, Agent, or Firm* — Kim & Stewart LLP (57) ABSTRACT

An example method of managing guest time for a virtual machine (VM) supported by a hypervisor of a virtualized host computer includes: configuring, by the hypervisor, a central processing unit (CPU) of the host computer to trap, to the hypervisor, access by guest code in the VM to a physical counter and timer of the CPU; configuring, by the hypervisor, the guest code in the VM to use the physical counter and timer of the CPU rather than a virtual counter and timer of the CPU; trapping, at the hypervisor, an access to the physical counter and timer by the guest code; and executing, by the hypervisor, the access to the physical counter and timer on behalf of the guest code while compensating for an adjustment of a system count of the physical counter and timer to maintain the guest time as scaled with respect to frequency of the physical counter and timer.

17 Claims, 6 Drawing Sheets

GUEST TIME SCALING FOR A VIRTUAL MACHINE IN A VIRTUALIZED COMPUTER SYSTEM

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Host central processing units (CPUs) can include timer-counter circuits, which an operating system (OS) can utilize to track the passage of time. These timer-counter circuits only track the passage of time and typically do not report the time or date (a host can include a real-time clock (RTC) for the purpose of tracking time and date). Some CPUs, such as those compatible with the ARM®v8 hardware architectures, include both a physical counter and timer and a virtual counter and timer. Physical timers compare against a system count of a physical counter. Virtual timers compare against a virtual count that can be offset from the system count (i.e., a count derived from the system count). The virtual count allows a hypervisor to show virtual time to a VM, which can be offset from the system time of the host. Some CPUs (e.g., ARMv8 CPUs) do not provide a way to scale the virtual count. Scaling the virtual count may be desirable in cases where the hypervisor wants to warp guest time (e.g., make guest timer elapse at a different pace) or in cases where a VM migrates from one host to another, where the virtual counter in the destination host has a different frequency than the virtual counter in the source host.

SUMMARY

One or more embodiments provide a method of managing guest time for a virtual machine (VM) supported by a hypervisor of a virtualized host computer. The method includes: configuring, by the hypervisor, a central processing unit (CPU) of the host computer to trap, to the hypervisor, access by guest code in the VM to a physical counter and timer of the CPU; configuring, by the hypervisor, the guest code in the VMM to use the physical counter and timer of the CPU rather than a virtual counter and timer of the CPU; trapping, at the hypervisor, an access to the physical counter and timer by the guest code; and executing, by the hypervisor, the access to the physical counter and timer on behalf of the guest code while compensating for an adjustment of a system count of the physical counter and timer to maintain the guest time as scaled with respect to frequency of the physical counter and timer.

Further embodiments include a non-transitory computer-readable storage medium comprising instructions that cause a computer system to carry out the above methods, as well as a computer system configured to carry out the above methods

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for guest time scaling for a virtual machine (VM) in a virtualized computer system are described. The virtualized computing system includes a hypervisor that supports virtual machines (VMs). A central processing unit (CPU) in the computer system includes a host physical counter and timer ("physical counter and timer") and a host virtual counter and timer ("virtual counter and timer"). In embodiments, the CPU is configured such that the counter and timer circuits of the CPU do not provide a mechanism for scaling either the physical counter and timer or the virtual counter and timer. Furthermore, the CPU is configured such that access to the virtual counter and timer by the guest code in the VM cannot be trapped to the hypervisor. This prevents the hypervisor from scaling the virtual counter and timer on behalf of the VM. The hypervisor can scale guest time in a VM for various purposes, including warping guest time (cause guest time to move faster or slower) and adjusting for a change in frequency of a system counter due to migration of a VM from a source host to a destination host.

Accordingly, a hypervisor of the computer system presents a virtual hardware platform to guest code in a virtual machine (VM) that masks the presence of the host virtual counter and timer, access to which cannot be trapped given the CPU as configured. The hypervisor presents instead the physical counter and timer for use by the guest code. The hypervisor configures the CPU to trap to the hypervisor access by the guest code to the physical counter and timer. Instructions to read from or write to registers of the physical counter and timer executed by the guest code generate exceptions, which are handled by hypervisor. An exception handler in the hypervisor performs the access to the physical counter and timer on behalf of the guest code while compensating for an adjustment of the system count of the physical counter and timer to maintain the guest time. The adjustment includes scaling the system count being read by the guest code and reverse scaling values being written to physical timer registers by the guest code, in order to maintain the guest time as scaled with respect to the frequency of the physical counter and timer. These and further aspects of the techniques are described below with respect to the drawings.

Figure 1:
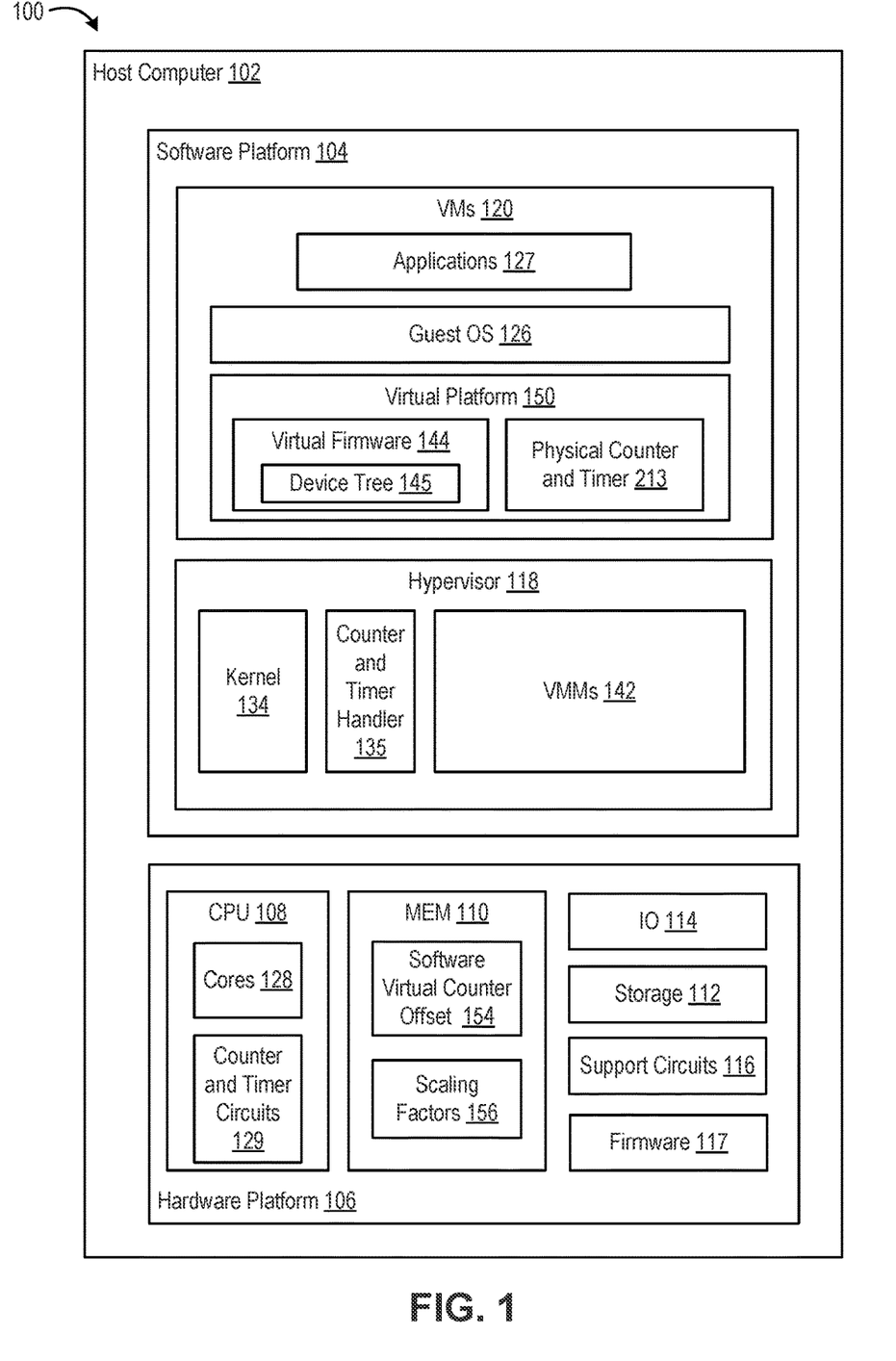
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (TO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 can be aggregated and provisioned as part of shared storage accessible through a physical network (not shown). Input/output devices 114 include conventional interfaces known in the art, such as one or more network interfaces. Support circuits 116 include conventional cache, power supplies, clock circuits, data registers, and the like. Firmware 117 controls initialization of hardware platform 106 and handoff of execution to hypervisor 118 upon power on of host computer 102.

CPU 108 includes one or more cores 128 and counter and timer circuits 129 (among other components not shown for simplicity). Each core 128 is a microprocessor, such as a microprocessor compliant with a version of the ARMv8 architecture or the like. Code is executed by a core 128 at a particular privilege level (PL) of a hierarchy of privilege levels. In an embodiment, CPU 108 having cores 128 compliant with the ARMv8 architecture or similar includes four exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, CPU 108 supports a hierarchy of at least three hierarchical privilege levels, including the user PL, the supervisor PL, and the hypervisor PL in order of increasing execution privilege. Various examples described herein refer to a CPU having a version of the ARMv8 hardware architecture and executing in the 64-bit execution state (referred to as AArch64). It is to be understood that the techniques described herein can be employed with CPUs having similar hardware architectures and instruction sets and that such techniques are not limited for use with ARMv8 architectures.

Figure 2A:
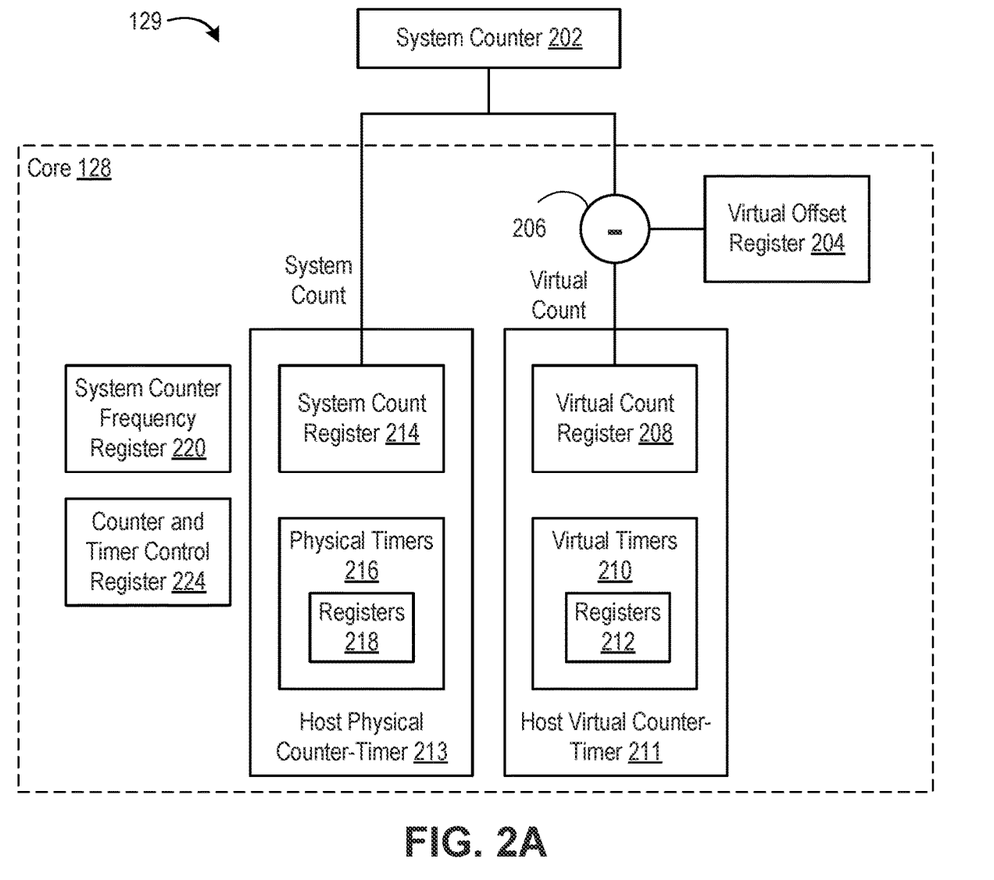
FIG. 2A is a block diagram depicting counter and timer circuits according to an embodiment.

FIG. 2A is a block diagram depicting counter and timer circuits 129 according to an embodiment. Counter and timer circuits 129 include a system counter 202 external to the cores 128. System counter 202 provides a fixed frequency incrementing system count. System counter 202 broadcasts the system count to all cores 128.

Each core 128 includes a system count register 214 configured to store the system count. Each core 128 further includes an offset circuit 206 and a virtual offset register 204. Virtual offset register 204 stores an offset to be applied to the system count to generate a virtual count. In the embodiment, the virtual count equals the system count minus the offset stored in virtual offset register 204. Core 128 includes a virtual count register 208 configured to store the virtual count. In an ARMv8 architecture, for example, system count register 214 is the CNTPCT_EL0, counter and timer physical counter register; virtual count register 208 is the CNTVCT_EL0, counter and timer virtual count register; and virtual offset register 204 is the CNTVOFF_EL2, counter and timer virtual offset register.

Core 128 includes a system counter frequency register 220. System counter frequency register 220 stores the frequency of system counter 202. System counter frequency register 220 is writeable at the highest implemented exception level and readable at all exception levels. In embodiments, firmware 117 executing at EL3 populates system counter frequency register 220 as part of early system initialization. Notably, hypervisor 118, executing at EL2, can only read system counter frequency register 220. A guest OS 126 in a VM 120, executing at EL1, can also read system counter frequency register 220. EL1 reads of system counter frequency register 220 cannot be trapped to EL2. Applications 127, executing at EL0, can read system counter frequency register 220. In embodiments, hypervisor 118 configures CPU 108 such that EL0 reads of system counter frequency register 220 cannot be trapped to EL2. This means that reads of system counter frequency register 220 by applications 127 cannot be detected by hypervisor 118.

In an ARMv8 architecture, for example, system counter frequency register 220 is the CNTFRQ_EL0, counter and timer frequency register. EL0 reads of CNTFRQ_EL0 can only be trapped to EL2 if HCR_EL2.TGE is set. HCR_EL2.TGE (a bit in the HCR_EL2, hypervisor configuration register) can be set to trap general exceptions from EL0 to EL2. However, when set, all exceptions that would be routed to EL1 are instead routed to EL2. This is undesirable, as every EL0 exception to EL1 would cause a VM exit to hypervisor 118 rather than being directly handled by the guest OS. Thus, in embodiments, hypervisor 118 does not set HCR_EL2.TGE and EL0 reads of CNTFRQ_EL0 cannot be trapped to hypervisor 118 executing at EL2.

Core 128 includes a set of physical timers 216 and a set of virtual timers 210. Physical timers 216 are implemented by registers 218 and virtual timers 210 are implemented by registers 212. These timers include comparators, which compare against the system count or virtual count. Software can configure these timers to generate interrupts or events in set points in the future. Each core 128 includes a host virtual counter and timer 211, which includes virtual count register 208 and virtual timers 210. Each core 128 includes a host physical counter and timer 213, which includes system count register 214 and physical timers 216. In general, a host virtual counter and timer is a counter and timer circuit in CPU 108 that includes a counter to track a virtual count and a timer to compare against the virtual count, where the virtual count is offset from a system count. A host physical counter and timer is a counter and timer circuit in CPU 108 that includes a counter to track a system count and a timer to compare against the system count. Host physical counter and timer may also be referred to herein as a physical counter and timer.

Figure 2B:
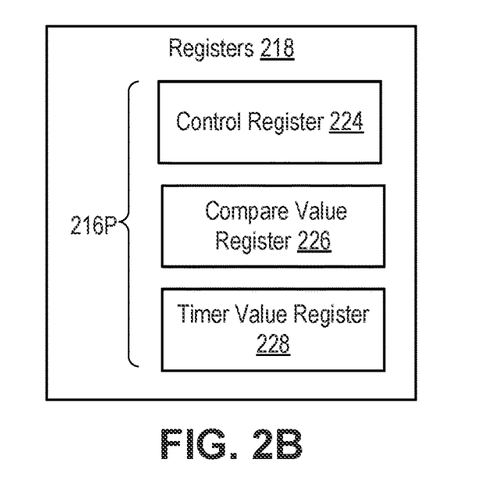
FIG. 2B is a block diagram showing a physical timer according to an embodiment.

FIG. 2B is a block diagram showing an EL1 physical timer 216P of physical timers 216 according to an embodiment. EL1 physical timer 216P includes a control register 224, compare value register 226, and time value register 228. Software writes a value to compare value register 226 and EL1 physical timer 216P triggers when the system count reaches or exceeds that value. Software can write a value to timer value register 228, in which case core 128 reads system count register 214 for the system count, adds the value in timer value register 228 to the system count, and stores the result in compare value register 226. Timer value register 228 decrements down to zero while the system count increments. Control register 224 controls the generation of interrupts. Software writes values to fields of control register 224 to enable EL1 physical timer 216P and enable or disable interrupt generation. Control register 224 can also report when EL1 physical timer 216P is firing. In an ARMv8 architecture, for example, an EL1 physical timer (CNTP_CTL_EL0, CNTP_CVAL_EL0, and CNTP_TVAL_EL0 registers) and an EL1 virtual timer (CNTV_CTL_EL0, CNTV_CVAL_EL0, and CNTV_TVAL_EL0 registers) are always present. Timers other than EL1 physical timer 216P are omitted for clarity but are structured the same way.

Returning to FIG. 1, software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). Hypervisor 118 includes a kernel 134, counter and timer handler 135, and virtual machine monitors (VMMs) 142. Kernel code of hypervisor 118 executes at EL2 (e.g., kernel 134). Unprivileged code of hypervisor 118 executes at EL0.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). Client applications 127 can be any applications executing on guest OS 126 within VM 120. Guest OS 126 executes at EL1 and applications 127 typically execute at EL0.

Kernel 134 provides operating system functionality (e.g., process creation and control, file system, process threads, etc.), as well as CPU scheduling and memory scheduling across guest software in VMs 120, VMMs 142, and counter and timer handler 135. VMMs 142 implement the virtual system support needed to coordinate operations between hypervisor 118 and VMs 120. Each VMM 142 manages a corresponding virtual hardware platform ("virtual platform 150") that includes emulated hardware, such as virtual CPUs (vCPUs) and guest physical memory (also referred to as VM memory). Each virtual platform 150 supports the installation of guest software in a corresponding VM 120. Each VMM 142 further maintains page tables (e.g., nested page tables (NPTs)) on behalf of its VM(s), which are exposed to CPU 108. Virtual platform 150 includes a virtual firmware 144 (e.g., a basic-input/output system (BIOS) or unified extensible firmware interface (UEFI) firmware). Virtual firmware 144 performs initialization of virtual platform 150 prior to handing off execution to a bootloader of guest OS 126. Virtual platform 150 includes a device tree 145. Device tree 145 is a data structure that describes the hardware configuration and topology of virtual platform 150.

As described above with respect to FIG. 2A, a hypervisor can use host virtual counter and timer 211 to offset guest time from system time. However, CPU 108 may not support scaling of the virtual count tracked by host virtual counter and timer 211. Guest time scaling for VMs 120 is important under several scenarios. For example, hypervisor 118 may need to speed up or slow down guest time for time synchronization. In another example, hypervisor 118 may need to scale guest time in response to migration of a VM, where the source host and the destination host have different system counter frequencies. To achieve time scaling, it is desirable to trap guest OS accesses to host virtual counter and timer 211 to EL2 so that hypervisor 118 can change the value of the virtual count and control progression of time for VM 120. In embodiments, however, CPU 108 does not support trapping EL0 and EL1 accesses to host virtual counter and timer 211 to EL2. For example, CPUs having an ARMv8 architecture without enhanced counter virtualization (e.g., ID_AA64MMFR0_EL1.ECV==0) do not support trapping EL0/EL1 access to the host virtual counter and timer to EL2.

In embodiments, hypervisor 118 hides the presence of host virtual counter and timer 211 from VMs 120. In an embodiment, virtual platform 150 masks the presence of host virtual counter and timer 211 in device tree 145. In such case, guest OS 126 cannot detect and use host virtual counter and timer 211. Virtual platform 150 presents physical counter and timer 213 to guest OS 126. Since host virtual counter and timer 211 is masked in device tree 145, guest OS 126 detects and uses physical counter and timer 213. In embodiments, CPU 108 supports trapping EL0/EL1 accesses of physical counter and timer 213 to EL2.

Referring to FIG. 2A, each core 128 can further include a counter and timer control register 224. Hypervisor 118 sets a field in counter and timer control register 224 to trap EL0 and EL1 accesses to registers 218 of EL1 physical timer 216P. Hypervisor 118 also sets a field in counter and timer control register 224 to trap EL0 and EL1 accesses to system count register 214. For example, in an ARMv8 architecture, counter and timer control register 224 can be CNTHCTL_EL2, counter and timer hypervisor control register. Hypervisor 118 can set CNTHCTL_EL2.{EL1PTEN, EL1PCTEN}==0 to trap EL0/EL1 accesses to system count register 214 and registers 218 of EL1 physical timer 216P. Guest OS 126 execution of an instruction to read system count register 214 (e.g., MRS(CNTPCT_EL0)) results in an exception to EL2 and a VM exit to hypervisor 118. Guest OS 126 execution of an instruction to write to control register 224, compare value register 226, or timer value register 228 results in an exception to EL2 and a VM exit to hypervisor 118.

Hypervisor 118 handles exceptions generated by EL0/EL1 accesses to physical counter and timer 213 with counter and timer handler 135. As discussed further below, hypervisor 118 maintains a software virtual counter offset 154 and scaling factors 156. Counter and timer handler 135 uses software virtual counter offset 154 to offset the system count similar to how the virtual count is offset from the system count using virtual offset register 204. Software virtual counter offset 154 can be the same value hypervisor 118 would write to virtual offset register 204. Scaling factors 156 are per VM 120 values that counter and timer handler 135 uses to scale the system count and timer values when handling the generated exceptions.

Masking host virtual counter and timer 211 to force guest OS 126 to use physical counter and timer 213 allows hypervisor 118 to perform guest time scaling without the need to paravirtualize guest OS 126 (i.e., modify operation of guest OS 126 with respect to counter and timer control). Guest OS 126 is configured to use device tree 145 as opposed to advanced configuration and power interface (ACPI) as the system description and honors the device tree node describing counter and timer vector availability. As noted above, CPU 108 is configured such that hypervisor 118 cannot trap EL0/EL1 accesses to system counter frequency register 220. Thus, guest OS 126 is configured to read the counter frequency only once during boot and does not support execution of applications that read system counter frequency register 220.

Figure 3:
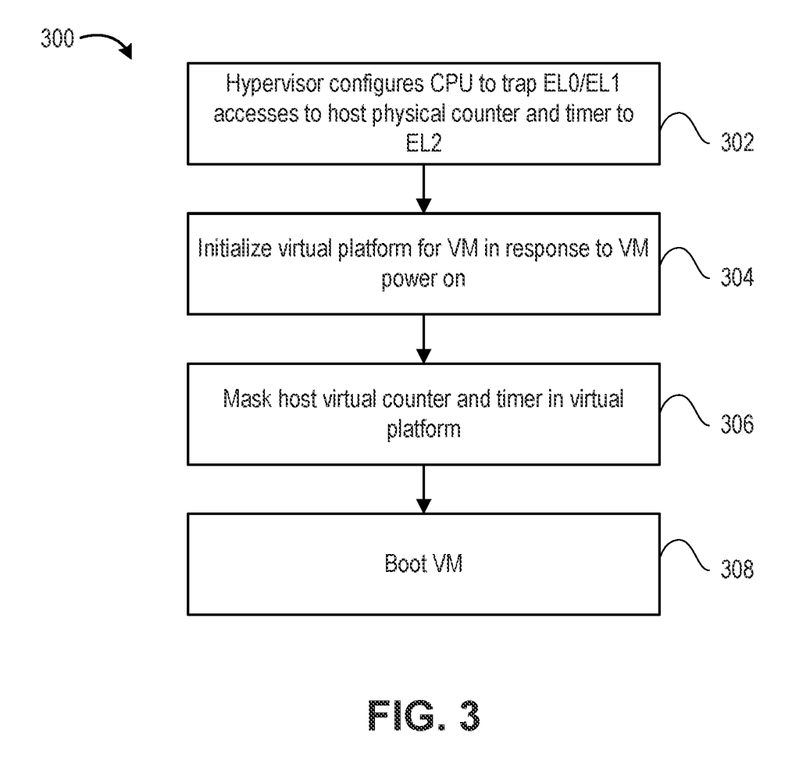
FIG. 3 is a flow diagram depicting a method of initializing a CPU and a VM according to an embodiment.

FIG. 3 is a flow diagram depicting a method 300 of initializing CPU 108 and a VM 120 according to an embodiment. Method 300 begins at step 302, where hypervisor 118 configures CPU 108 to trap EL0/EL1 accesses to host physical counter and timer 213 to EL2. In embodiments, hypervisor 118 writes to fields in counter and timer control register 224 in each core 128 to configure CPU 108 to generate exceptions to EL2 when software running at EL0 or EL1 attempts to read system count register 214 or write to registers 218 of EL1 physical timer 216P.

At step 304, hypervisor 118 initializes virtual platform 150 for a VM 120 in response to VM power on. At step 306, hypervisor 118 masks host virtual counter and timer 213 in virtual platform 150. In embodiments, virtual platform 150 presents system configuration to guest OS 126 using device tree 145. Hypervisor 118 masks the presence of host virtual counter and timer 213 by omitting it from the system configuration. In such case, virtual platform 150 includes physical counter and timer 213 and does not include host virtual counter and timer 211. Guest OS 126 detects presence of physical counter and timer 213 by parsing device tree 145. At step 308, hypervisor 118 boots VM 120. VM 120 executes virtual firmware 144, which loads device tree 145 into memory and passes execution to a bootloader of guest OS 126. After method 300, guest OS 126 uses host physical counter and timer 213 for timing and hypervisor 118 can scale guest time as needed.

Figure 4:
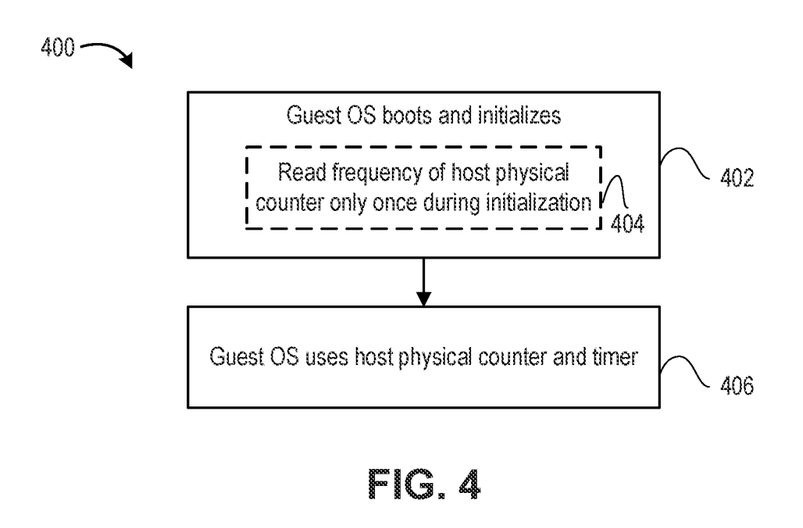
FIG. 4 is a flow diagram depicting a method of initializing a guest OS in a VM according to an embodiment.

FIG. 4 is a flow diagram depicting a method 400 of initializing a guest OS 126 in a VM 120 according to an embodiment. Method 400 begins at step 402, where guest OS 126 boots and performs initialization. As part of initialization, at step 404, guest OS 126 reads the frequency of host physical counter and timer. That is, guest OS 126 reads system counter frequency register 220 to obtain the frequency of the system count to be used for timing in guest OS 126. As noted above, guest OS 126 does not read the frequency of the system count again and does not support applications that read the frequency of the system count. At step 406, guest OS 126 uses host physical counter and timer 213 for timing. That is, guest OS 126 can read system count register 214 and write to registers 218 of physical timers (e.g., registers of EL1 physical timer 216P).

Figure 5:
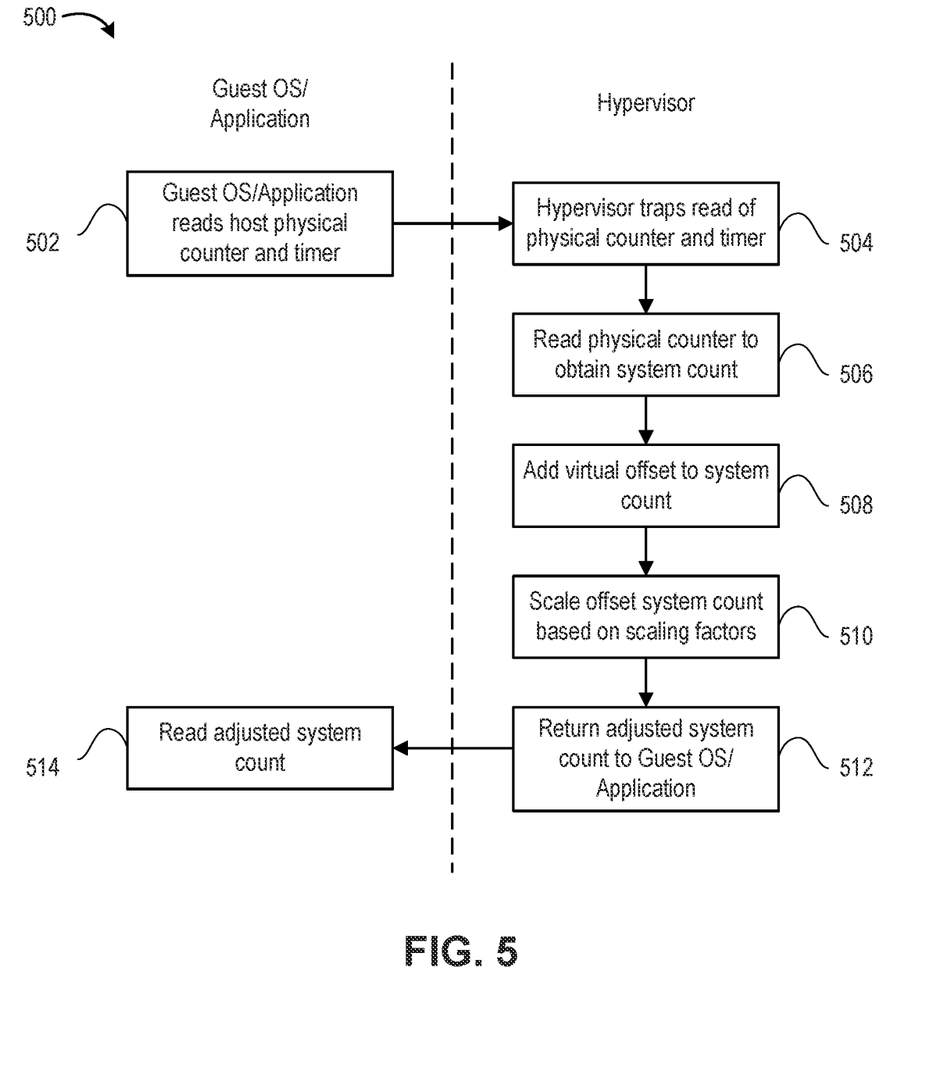
FIG. 5 is a flow diagram a method of handling an exception at a hypervisor in response to guest OS/application reads of the system count of a host physical counter and timer according to an embodiment.

FIG. 5 is a flow diagram a method 500 of handling an exception at a hypervisor 118 in response to guest OS/application reads of the system count of a host physical counter and timer 213 according to an embodiment. Hypervisor 118 and guest OS 126/application 127 perform method 500 after the initialization described above in methods 300 and 400. Method 500 begins at step 502, where guest OS 126 or application 127 reads the system count from host physical counter and timer 213. In embodiments, guest OS 126 or application 127 executes an instruction to read system count register 214 (e.g., MRS(CNTPCT_EL0) for an ARMv8 architecture). Guest OS 126 executes at EL1 and application 127 executes at EL0. Thus, the instruction to read system count register 214 triggers an exception to hypervisor 118, which executes at EL2. Execution exits VM 120 to hypervisor 118, which handles the exception with counter and timer handler 135.

At step 504, hypervisor traps the read of the system count from physical counter and timer 213. At step 506, counter and timer handler 135 reads the system count from physical counter and timer 213. In embodiments, counter and timer handler 135 executes an instruction to read system count register 214 (e.g., MRS(CNTPCT_EL0) for an ARMv8 architecture). At step 508, counter and timer handler 135 adds software virtual counter offset 154 to the system count. This emulates use of the virtual count and the offset provided by virtual counter register 208.

At step 510, counter and timer handler 135 scales the offset system count based on scaling factors 156. In an embodiment, scaling factors 156 include an addend (add), a multiplicand (mult), and a shift value (shift). Counter and timer handler 135 can scale the offset system count (hVal) as follows: add+(mult*hVal»shift), where» denotes a right shift. At step 512, counter and timer handler 135 returns the adjusted system count to guest OS 126/application 127. At step 514, guest OS 126/application 127 reads and uses the adjusted system count for timing.

Figure 6:
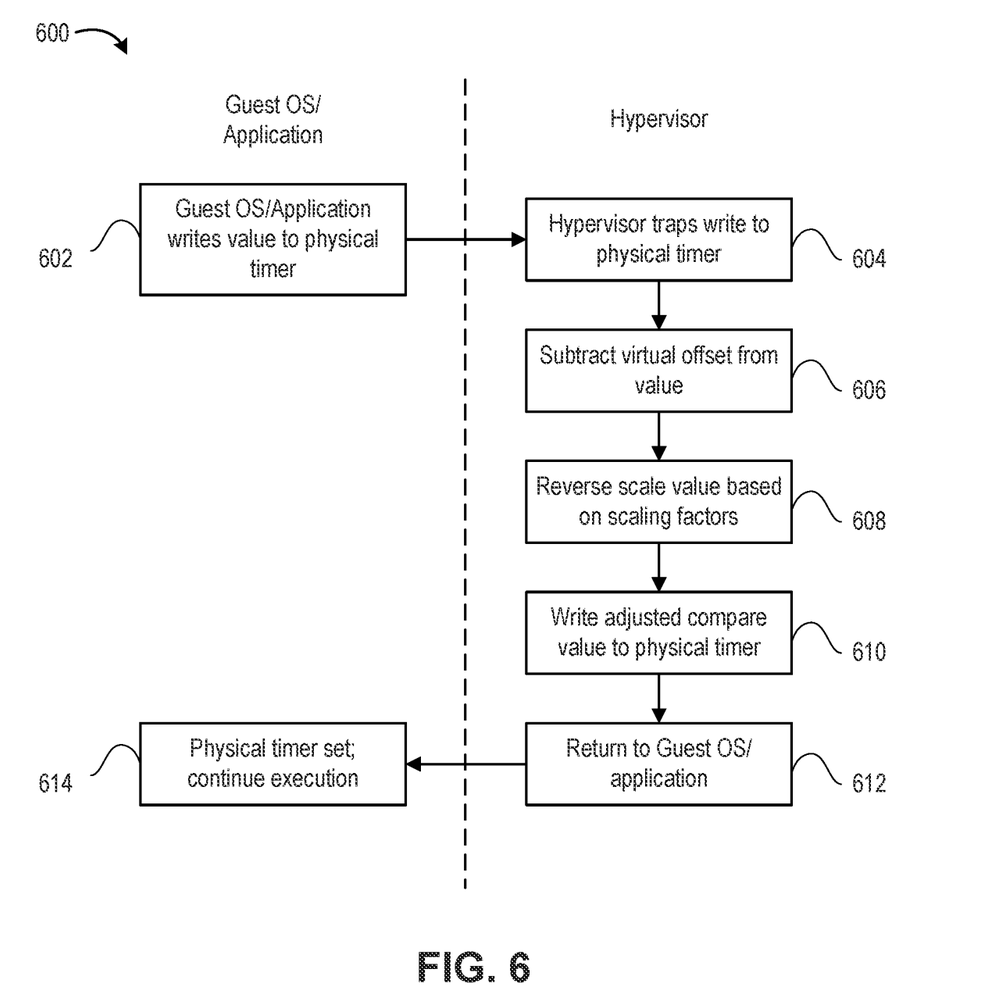
FIG. 6 is a flow diagram depicting a method of handing an exception at a hypervisor in response to guest OS/application writes to registers of a physical timer in a host physical counter and timer according to an embodiment.

FIG. 6 is a flow diagram depicting a method 600 of handing an exception at a hypervisor 118 in response to guest OS/application writes to registers of a physical timer in host physical counter and timer 213 according to an embodiment. Hypervisor 118 and guest OS 126/application 127 perform method 600 after the initialization described above in method 300 and 400. Method 600 begins at step 602, where guest OS 126/application 127 writes a value to the physical timer. For example, the software can write a compare value to compare value register 226 of EL1 physical timer 216P (e.g., MSR(CNTP_CVAL_EL0, gVal), where gVal is the compare value). In another example, the software can write a timer value to timer value register 228 of EL1 physical timer 216P (e.g., MSR(CNTP_TVAL_EL0, gVal), where gVal is the timer value). The instruction to write the value to the physical timer register triggers an exception to hypervisor 118. Execution exits VM 120 to hypervisor 118, which handles the exception with counter and timer handler 135.

At step 604, hypervisor 118 traps the write to the physical timer register. At step 606, counter and timer handler 135 subtracts virtual offset 154 from the value. Hypervisor 118 adds virtual offset 154 to the system count when returning the adjusted system count to guest OS 126/application 127. However, virtual offset 154 is not applied by CPU 108 to the system count. So any value to be written to the physical timer register needs to be adjusted for virtual offset 154.

At step 608, counter and timer handler 135 scales the offset value based on scaling factors 156. In the embodiment above, scaling factors 156 include the addend (add), multiplicand (mult), and shift value (shift). Counter and timer handler 135 scales the offset value (gVal) as follows: ((gVal−add)«shift)/mult, where «denotes a left shift. As discussed above, hypervisor 118 scales the system count when returning the adjusted system count to guest OS 126/application 127. However, the scaling is not applied by CPU 108 to the system count in counter and timer circuits 129. Since guest OS 126/application 127 receives the system count as scaled, and determines the value to be written to the physical timer register based on this scaled system count, counter and timer handler 135 must undo this scaling before wring the value to the physical timer register in CPU 108.

At step 610, counter and timer handler 135 writes the adjusted compare value to the physical timer register. At step 612, counter and timer handler 135 returns to guest OS 126/application 127. A step 614, guest OS 126/application 127 deems the physical timer to be set and continues execution.

Techniques for guest time scaling in a VM of a virtualized computer system have been described. In embodiments, hypervisor 118 can scale the guest time to elapse at a different pace (faster or slower) than host time. To achieve the scaling, hypervisor 118 need only update scaling factors 156 for the guest. In other embodiments, a hypervisor 118 can scale the guest time to adapt to a change of the host virtual counter due to migration of a VM from a source host to a destination host. In this scenario, the pace of guest time does not change, but the hypervisor needs to adapt to a change in the host timer. To do so, the hypervisor need only update the scaling factors for the guest as in the previous scenario. However, the hypervisor must also update the physical system registers that hold a timer value, such as compare value register 226.

Consider the following example: the frequency of the source host system counter is 100 MHz. At the moment the VM state is saved to prepare for migration, assume the value of compare value register 226 minus the virtual count is 100,000,000 (i.e., 1 second in the future). Assume the frequency of the destination host system counter is 200 MHz. At the moment the VM is restored, the hypervisor must ensure that the difference between the value of compare value register 226 and the virtual count is now 200,000,000 (i.e., 1 second in the future). That is, the hypervisor must preserve the timing of the delivery of timer interrupts that have been set by the guest OS.

Figure 7:
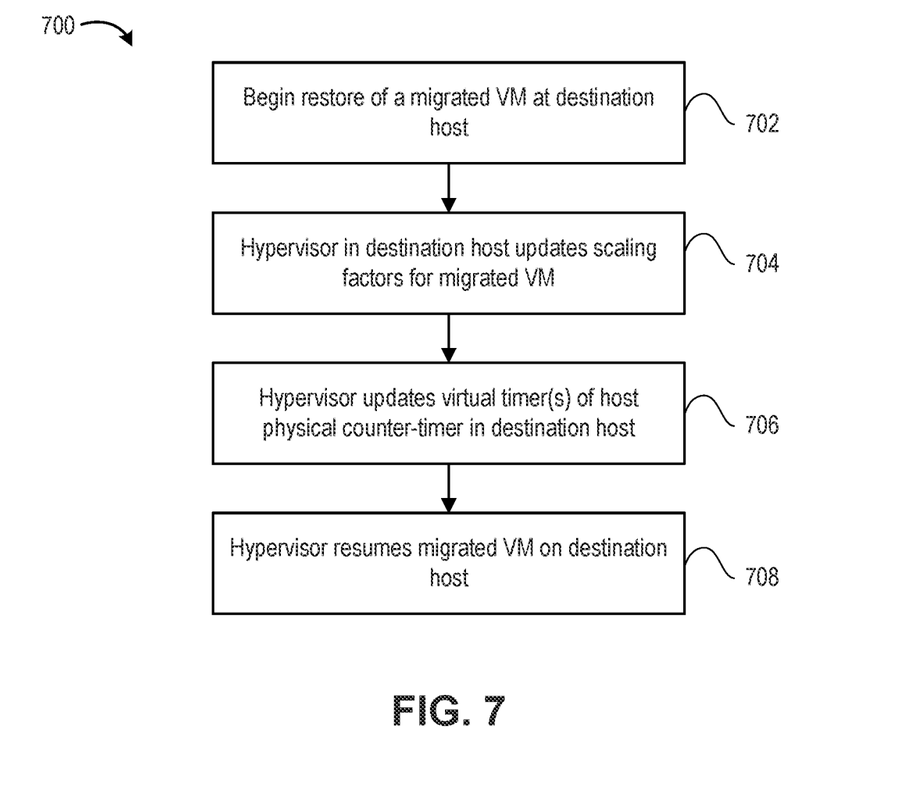
FIG. 7 is a flow diagram depicting a method of scaling guest time after migration of a VM from a source host according to an embodiment.

FIG. 7 is a flow diagram depicting a method 700 of scaling guest time after migration of a VM from a source host according to an embodiment. Method 700 begins at step 702, where hypervisor 118 in the destination host begins restore of the migrated VM. At step 704, hypervisor 118 in the destination host updates scaling factors 156 for the migrated VM. Hypervisor 118 adjusts scaling factors 156 to compensate for a change in frequency of the system count between the source host and the destination host. At step 706, hypervisor 118 updates virtual timer(s) of host physical counter and timer 213 in the destination host. For example, hypervisor 118 can update the compare value in EL physical timer 216P (e.g., the value in compare value register 226) based on the change in system count frequency. At step 708, hypervisor 118 resumes the migrated VM on the destination host.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing guest time for a virtual machine (VM) supported by a hypervisor of a virtualized host computer, the method comprising:
    configuring, by the hypervisor, a central processing unit (CPU) of the host computer to trap, to the hypervisor, access by guest code in the VM to a physical counter and timer of the CPU;
    configuring, by the hypervisor, the guest code in the VM to use the physical counter and timer of the CPU rather than a virtual counter and timer of the CPU by masking, a device tree presented to the guest code by the hypervisor, presence of the virtual counter and timer in the CPU;
    trapping, at the hypervisor, an access to the physical counter and timer by the guest code; and
    executing, by the hypervisor, the access to the physical counter and timer on behalf of the guest code while compensating for an adjustment of a system count of the physical counter and timer to maintain the guest time as scaled with respect to frequency of the physical counter and timer.

2. The method of claim 1, wherein the access to the physical counter and timer by the guest code comprises an instruction to read a system counter register of the physical counter and timer, the system counter register storing the system count, and wherein the step of executing comprises:
    reading, by the hypervisor, the system count from the system count register;
    scaling the system count based on scale factors associated with the VM to generate a scaled system count; and
    returning the scaled system count to the guest code.

3. The method of claim 2, wherein the step of executing further comprises:
    offsetting the system count prior to scaling using a virtual offset.

4. The method of claim 1, wherein the access to the physical counter and timer by the guest code comprises an instruction to write to physical timer register of the physical counter and timer, and wherein the step of executing comprises:
    reverse scaling a value to be written to the physical timer register based on scale factors associated with the VM to generate an unscaled value; and
    writing the unscaled value to the physical timer register.

5. The method of claim 4, wherein the step of executing further comprises:
    subtracting, prior to the reverse scaling, a virtual offset from the value.

6. The method of claim 1, wherein the guest code executes at a user privilege level or a supervisor privilege level of the CPU, wherein the hypervisor executes at a hypervisor privilege level more privileged than the user privilege level and the supervisor privilege level, and wherein the access by the guest code to the physical counter and timer generates an exception from the user privilege level or the supervisor privilege level to the hypervisor privilege level, the hypervisor executing a handler in response to the exception, the handler performing the step of executing.

7. A non-transitory computer readable medium comprising instructions to be executed in a computing device to cause the computing device to carry out a method of managing guest time for a virtual machine (VM) supported by a hypervisor of a virtualized host computer, the method comprising:
    configuring, by the hypervisor, a central processing unit (CPU) of the host computer to trap, to the hypervisor, access by guest code in the VM to a physical counter and timer of the CPU;
    configuring, by the hypervisor, the guest code in the VM to use the physical counter and timer of the CPU rather than a virtual counter and timer of the CPU by masking, a device tree presented to the guest code by the hypervisor, presence of the virtual counter and timer in the CPU;
    trapping, at the hypervisor, an access to the physical counter and timer by the guest code; and
    executing, by the hypervisor, the access to the physical counter and timer on behalf of the guest code while compensating for an adjustment of a system count of the physical counter and timer to maintain the guest time as scaled with respect to frequency of the physical counter and timer.

8. The non-transitory computer readable medium of claim 7, wherein the access to the physical counter and timer by the guest code comprises an instruction to read a system counter register of the physical counter and timer, the system counter register storing the system count, and wherein the step of executing comprises:
    reading, by the hypervisor, the system count from the system count register;

scaling the system count based on scale factors associated with the VM to generate a scaled system count; and returning the scaled system count to the guest code.

9. The non-transitory computer readable medium of claim 8, wherein the step of executing further comprises:
offsetting the system count prior to scaling using a virtual offset.

10. The non-transitory computer readable medium of claim 7, wherein the access to the physical counter and timer by the guest code comprises an instruction to write to physical timer register of the physical counter and timer, and wherein the step of executing comprises:
reverse scaling a value to be written to the physical timer register based on scale factors associated with the VM to generate an unscaled value; and
writing the unscaled value to the physical timer register.

11. The non-transitory computer readable medium of claim 10, wherein the step of executing further comprises:
subtracting, prior to the reverse scaling, a virtual offset from the value.

12. The non-transitory computer readable medium of claim 7, wherein the guest code executes at a user privilege level or a supervisor privilege level of the CPU, wherein the hypervisor executes at a hypervisor privilege level more privileged than the user privilege level and the supervisor privilege level, and wherein the access by the guest code to the physical counter and timer generates an exception from the user privilege level or the supervisor privilege level to the hypervisor privilege level, the hypervisor executing a handler in response to the exception, the handler performing the step of executing.

13. A virtualized computer system, comprising:
a hardware platform including a central processing unit (CPU), the CPU having a physical counter and timer and a virtual counter and timer; and
a software platform including a hypervisor executing on the hardware platform and a virtual machine (VM) supported by the hypervisor, the VM executing guest code, the hypervisor configured to:
configure the CPU to trap, to the hypervisor, access by the guest code in the VM to the physical counter and timer;
configure the guest code in the VM to use the physical counter and timer of the CPU rather than the virtual counter and timer of the CPU by masking, a device tree presented to the guest code by the hypervisor, presence of the virtual counter and timer in the CPU;
trap an access to the physical counter and timer by the guest code; and
execute the access to the physical counter and timer on behalf of the guest code while compensating for an adjustment of a system count of the physical counter and timer to maintain a guest time for the VM as scaled with respect to frequency of the physical counter and timer.

14. The virtualized computer system of claim 13, wherein the access to the physical counter and timer by the guest code comprises an instruction to read a system counter register of the physical counter and timer, the system counter register storing the system count, and wherein the hypervisor is configured to:
read the system count from the system count register;
scale the system count based on scale factors associated with the VM to generate a scaled system count; and
return the scaled system count to the guest code.

15. The virtualized computer system of claim 14, wherein the hypervisor is configured to:
offset the system count prior to scaling using a virtual offset.

16. The virtualized computer system of claim 13, wherein the access to the physical counter and timer by the guest code comprises an instruction to write to physical timer register of the physical counter and timer, and wherein the hypervisor is configured to:
reverse scale a value to be written to the physical timer register based on scale factors associated with the VM to generate an unscaled value; and
write the unscaled value to the physical timer register.

17. The virtualized computer system of claim 16, wherein the hypervisor is configured to:
subtract, prior to the reverse scaling, a virtual offset from the value.

* * * * *